Figure 1:
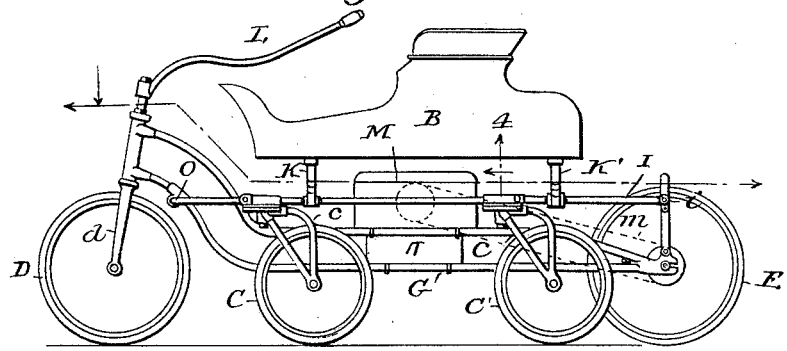

No. 700,926. Patented May 27, 1902.
B. C. HICKS.
VEHICLE.
(Application filed Nov. 10, 1899.)

(No Model.)

Witnesses  
Inventor  
John C. Hicks  
Attorneys

UNITED STATES PATENT OFFICE.

BOHN C. HICKS, OF CHICAGO, ILLINOIS.

VEHICLE.

SPECIFICATION forming part of Letters Patent No. 700,926, dated May 27, 1902.

Application filed November 10, 1899. Serial No. 736,494. (No model.)

*To all whom it may concern:*

Be it known that I, BOHN C. HICKS, a citizen of the United States, residing at Chicago, in the county of Cook and State of Illinois, have invented certain new and useful Improvements in Vehicles, of which the following is a specification.

My invention relates to vehicles, and more especially to vehicles intended to carry the motive power for their own propulsion and to improvements in the running-gear and the supports thereof for such vehicles.

The invention consists in the use and combination of two frames independently supported and adapted to coact to overcome the transmission of shocks and vibrations to the body of such a vehicle, and further consists in the various features of invention and forms of construction and relation of parts set forth in this specification.

An embodiment of the invention and a preferable form thereof is set forth in the drawings accompanying this specification, in which—

Figure 2:
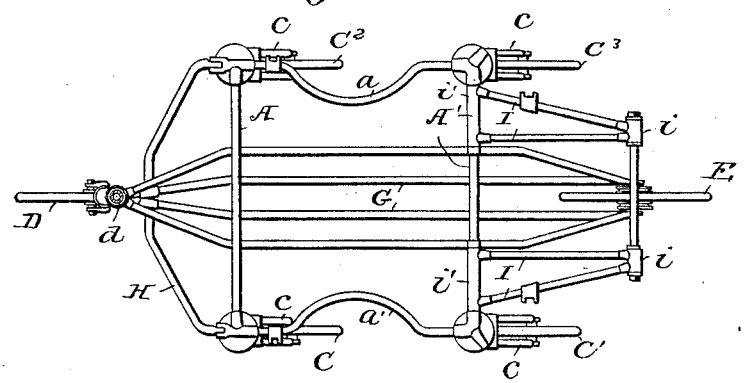
Figures 3, 4:
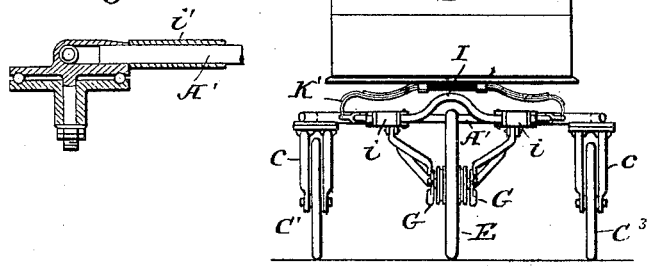

Figure 1 represents a side elevation of said embodiment; Fig. 2, a plan view of the running-gear of said vehicle; Fig. 3, a rear view of the same; and Fig. 4, an enlarged sectional view of a detailed portion of the mechanism, taken on the line 4 of Fig. 1.

Referring to the drawings, as shown, the main frame of the vehicle is composed of the cross-pieces A and A', joined together by two longitudinal pieces $a$ and $a'$. As shown, these longitudinal pieces are preferably bent inward, but may have any form. This frame is intended to support or assist in supporting the body B of the vehicle and to carry supporting-wheels, as C, C', C², and C³, which may be of any number desired and which preferably are pivotally connected to said frame, whereby they may independently turn laterally in planes at right angles to their revolution. As shown, said wheels are mounted in forks $c$, pivotally secured to the frame of the vehicle; but it is obvious that the supporting-wheels may be mounted or attached in any other known way. These supporting-wheels may carry all or a part of the weight of the vehicle-body and which may be proportioned as desired. These wheels are shown as preferably pivotally connected to the supporting-frame, as they thus allow the vehicle to better accommodate itself in its movements to curves in the roadway and permit of more readily turning or guiding the vehicle, and also by such means of connection the wheels are given greater play in their movements and lateral strain and wear upon said wheels and upon the tires of the wheels is diminished.

A supplementary frame G is operatively connected with the frame A, preferably at the forward end thereof. This supplementary frame may be supported by one or more wheels at either end for steering and driving the same, and said wheels may be operatively connected to said frame in any known way and to suit requirements. Preferably and as shown the steering-wheel D is operatively connected with the frame G by the steering head and forks $d$, and the driving-wheel E is mounted upon rearward extensions of the frame G. As shown, the frames are operatively connected at their forward portions by the connecting-rod H, pivotally connected to the main frame A at its lateral extremities and to the supplementary frame G at O. By this means it will be seen that the supplementary frame and steering-wheel may freely rise and fall to a considerable degree independently of and without interfering with the movement of the main frame. The two frames may be left free and unconnected at their rearward portions, or they may be operatively connected by any flexible connections, allowing free vertical movement between them. As shown, they are pivotally connected by the rods I, connecting at $i$ and $i'$ with the two frames, respectively, by sleeves or collars, thus allowing the rear wheel to rise and fall independently of the main frame. The vehicle-body B may be mounted by suitable supports upon the main frame or partly upon each frame, or upon the connections between the two frames, as desired. As shown, it is mounted at the forward portion upon the main frame at K and at the rearward portion upon the connections I at K'.

Any ordinary and convenient means connected with the steering-head of the wheel D may be employed for steering said wheel—as, for instance, the lever L.

The motive power for propelling the vehicle may be mounted in any convenient manner or position. As shown, the motor M is upon the supplementary frame and any ordinary means may be employed for transmitting said power to the driving-wheel, as the chain or belt $m$.

The wheels C, C', C², and C³ are shown as pivotally connected with the main frame by connections shown in detail in Fig. 4, showing the use of ball-bearings between the coöperating parts.

An advantage resulting from having the wheels of the main frame connected therewith by a pivotal connection, substantially as shown, is that in lateral movement and in turning the said wheels follow the movement of the frame and side strain upon said wheels and upon their tires is avoided, which is important in the case of pneumatic tires. Wheels so mounted also yield somewhat to obstacles, and also permit readily lateral movement of the frame, and thus facilitate turning and guiding, as well as to make the movements of the vehicle easy and comfortable. The easy guidance of the vehicle renders it safer, and its equilibrium and stability are preserved from the fact that the wheels are always directed in the line of progress of a given portion of the frame.

It will be seen that by the construction and arrangement of the frames and connections independent vertical movement is permitted between the frames and that shocks and vibration upon the supplementary frame are not transmitted to the main frame.

It is evident that the steering-wheel D and the driving-wheel E may each be mounted upon separate frames instead of being mounted upon the same frame, as G, and that each of such frames may be independently connected with the main frame of the vehicle and the invention still be made use of.

Without restricting myself to the particular forms and constructions shown, I claim—

1. In a vehicle, a frame supported laterally by one or more wheels on each side of said frame operatively connected thereto to have an independent rotating movement in planes at right angles to the planes of their revolution, and a steering-wheel independently mounted and operatively connected with said frame for steering the same, to permit vertical as well as lateral movement of said steering-wheel independently of said frame.

2. In a vehicle, a frame supported laterally by one or more wheels on each side of said frame operatively connected thereto to have an independent rotating movement in planes at right angles to the planes of their revolution, a steering-wheel independently mounted and operatively connected with said frame, and a driving-wheel independently mounted and operatively connected with said frame for driving the same and to permit vertical movement of said driving-wheel independently of said frame.

3. In a vehicle, a frame supported laterally by one or more wheels on each side of said frame operatively connected thereto to have an independent rotating movement in planes at right angles to the planes of their revolution, a steering-wheel independently mounted and operatively connected with said frame to permit vertical as well as lateral movement of said steering-wheel independently of said frame, a driving-wheel independently mounted and operatively connected with said frame for driving the same and to permit vertical movement of said driving-wheel independently of said frame, and a vehicle-body, in combination with supports for said body, whereby said body is supported by said frames and wheels and a reciprocating movement is permitted in the vertical movement of the supporting parts and the vertical movement of said supporting parts is divided between the said parts, and transmission of such motion to the body of said vehicle is diminished.

4. In a vehicle, a frame supported laterally by one or more wheels on each side of said frame operatively connected thereto to have an independent rotating movement in planes at right angles to the planes of their revolution, in combination with a coöperating frame independently supported upon wheels for steering and for guiding the same, said frames operatively connected to permit independent vertical movement between said frames.

5. In a vehicle, a frame supported laterally by one or more wheels on each side of said frame operatively connected thereto to have an independent rotating movement in planes at right angles to the planes of their revolution, in combination with a coöperating frame independently supported upon wheels for steering and for driving the same, flexible connections operatively connecting said frames to permit independent vertical movement between said frames, a vehicle-body, in combination with means for supporting said body, whereby the weight and support of said body is divided between said supporting parts and vertical movement and vibration of said supporting parts is divided and counteracted between said parts and only partially transmitted to the body of said vehicle.

6. In a vehicle, a frame supported laterally by one or more wheels on each side of said frame operatively connected thereto to have an independent rotating movement in planes at right angles to the planes of their revolution, in combination with a coöperating frame independently supported on wheels for steering and for driving the same, flexible connections operatively connecting said frames to permit independent vertical movement between said frames, a vehicle-body for said vehicle, means for supporting said body operatively connected with said frames, whereby the weight and support of said body are divided between and supported by said frame, and mechanism for driving said vehicle mounted upon one of said frames, whereby means for the support and application of the motor is provided independently of the other of said frames, and vibrations from said motor are not transmitted directly to the body of said vehicle.

7. In a vehicle of the class described, the combination of a frame portion carrying two wheels at each side thereof, a front steering-wheel pivotally secured to the frame portion so as to have a vertical as well as a lateral movement arranged at or near the longitudinal center of the vehicle, and a rear driving-wheel pivotally secured to the frame portion so as to have an independent vertical movement and arranged at or near the center of the vehicle, substantially as set forth.

8. In a vehicle of the class described, the combination of a main frame portion provided with two wheels at each side thereof independently pivotally secured thereto so as to have independent lateral movements, a supplementary frame portion carrying a front steering-wheel, and a rear driving-wheel arranged in the longitudinal center of the vehicle and pivotally secured to the main frame so as to permit such wheels to have independent vertical movements, substantially as described.

9. In a vehicle of the class described, the combination of a main frame portion provided with two wheels at each side thereof, means for pivotally securing such wheels to the main frame so as to permit them to have independent lateral movements, a supplementary frame portion arranged along the longitudinal center of the vehicle and provided with a front steering-wheel and a rear driving-wheel, connecting-rod mechanism pivotally connecting the front portion of the supplementary frame to the front portion of the main frame, and connecting-rod mechanism pivotally securing the rear portion of the supplementary frame to the rear portion of the main frame, substantially as described.

In testimony whereof I have signed my name to this specification in the presence of two subscribing witnesses.

BOHN C. HICKS.

Witnesses:
CHAS. C. TILLMAN,
A. GUSTAFSON.